US010200606B2

(12) United States Patent
Ishikuri

(10) Patent No.: US 10,200,606 B2
(45) Date of Patent: Feb. 5, 2019

(54) IMAGE PROCESSING APPARATUS AND CONTROL METHOD OF THE SAME

(71) Applicant: CANON KABUSHIKI KAISHA, Tokyo (JP)

(72) Inventor: Ryuichi Ishikuri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 14/926,275

(22) Filed: Oct. 29, 2015

(65) Prior Publication Data
US 2016/0134809 A1    May 12, 2016

(30) Foreign Application Priority Data

Nov. 7, 2014   (JP) .................................. 2014-227486

(51) Int. Cl.
*H04N 7/00* (2011.01)
*H04N 5/232* (2006.01)

(52) U.S. Cl.
CPC ..... *H04N 5/23238* (2013.01); *H04N 5/23293* (2013.01)

(58) Field of Classification Search
CPC ....................... H04N 5/23238; H04N 5/23293
See application file for complete search history.

(56) References Cited

U.S. PATENT DOCUMENTS

2012/0056977 A1* 3/2012 Ohnishi ................ G06T 3/0043
348/36
2012/0268554 A1* 10/2012 Gilbert-Schachter .......................
G03B 37/04
348/36

(Continued)

FOREIGN PATENT DOCUMENTS

JP    2003-219389 A    7/2003
JP    2003-276542 A    10/2003

(Continued)

OTHER PUBLICATIONS

The documents cited herein were cited in the Aug. 13, 2018 Japanese Office Action, enclosed without an English Translation, that issued in Japanese Patent Application No. 2014227486.

(Continued)

*Primary Examiner* — Sathyanaraya V Perungavoor
*Assistant Examiner* — Howard D Brown, Jr.
(74) *Attorney, Agent, or Firm* — Cowan, Liebowitz & Latman, P.C.

(57) ABSTRACT

An image processing apparatus comprises an image obtaining unit configured to obtain an omnidirectional image, a traveling direction obtaining unit configured to obtain information on a traveling direction of an image capturing apparatus when the omnidirectional image was shot, and a processing unit configured to perform processing of panoramic expansion on the omnidirectional image obtained by the image obtaining unit, based on the information on the traveling direction obtained with the traveling direction obtaining unit, such that an image portion corresponding to the traveling direction is positioned at a horizontal center in a panoramically expanded image, wherein the processing unit performs processing of panoramic expansion in accordance with change in the traveling direction in a case where the traveling direction changes while shooting the omnidirectional image that is a moving image.

22 Claims, 5 Drawing Sheets

(56) References Cited

U.S. PATENT DOCUMENTS

2014/0139624 A1* 5/2014 Shinozaki .......... H04N 5/23238
                                                 348/38
2014/0267589 A1* 9/2014 Matsubara ......... H04N 5/23238
                                                 348/36

FOREIGN PATENT DOCUMENTS

| JP | 2006-191535 A | 7/2006 |
| JP | 2006-229631 A | 8/2006 |
| JP | 2008-009843 A | 1/2008 |
| JP | 2010-093671 A | 4/2010 |
| JP | 2011-040898 A | 2/2011 |
| JP | 2012-052852 A | 3/2012 |
| JP | 2013-205925 A | 10/2013 |

OTHER PUBLICATIONS

The documents cited herein were cited in the Nov. 16, 2018 Japanese Office Action, enclosed without an English Translation, that issued in Japanese Patent Application No. 2014227486.

* cited by examiner

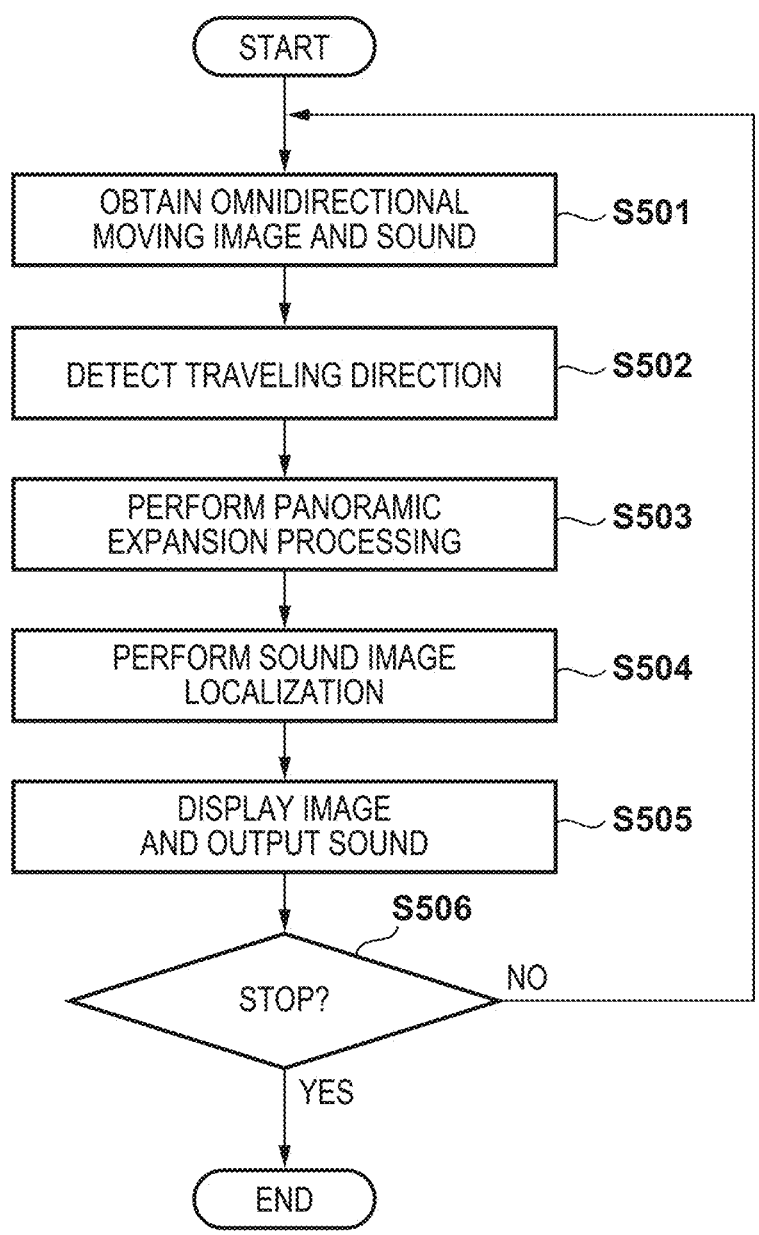

IMAGE PROCESSING APPARATUS AND CONTROL METHOD OF THE SAME

BACKGROUND OF THE INVENTION

Field of the Invention

The present invention relates to a technique for panoramically expanding an omnidirectional image.

Description of the Related Art

Omnidirectional images shot with an omnidirectional camera or the like and covering 360 degrees are known. An omnidirectional image is an image that is shot with an omnidirectional camera or a camera in which a fish eye lens is used and has, within a field angle, an entire range of 360 degrees in the horizontal direction. An omnidirectional image has a donut shape as shown in FIG. 1A, and therefore is an image hard to view for a viewer if displayed without any processing. In view of this, expanding the omnidirectional image in FIG. 1A into a panoramic image as in FIG. 1B through image processing (hereinafter, referred to as panoramic expansion) is commonly performed. The entire range (360 degrees) of the omnidirectional image having a donut shape is panoramically expanded such that the omnidirectional image is divided at an arbitrary position in the horizontal direction (circumferential direction of the omnidirectional image having a donut shape), image processing is performed so as to make the circumference of the omnidirectional image follow a straight line, and a panoramic image covering all the directions is generated. The divided position will be the two ends of the panoramic image.

As a technique for determining a divided position during this panoramic expansion, Japanese Patent Laid-Open No. 2006-191535 discloses a technique in which face recognition is performed on an image that was panoramically expanded at an arbitrary position, and in the case where a person overlaps with the divided position, a divided position is determined again and the panoramic expansion is started over.

However, Japanese Patent Laid-Open No. 2006-191535 envisions a usage mainly for performing shooting with a fixed camera such as shooting of a conference, and a case of reproducing a moving image made up of omnidirectional images shot while moving a camera (hereinafter, referred to as omnidirectional moving image) is not considered. In an omnidirectional moving image shot while moving a camera, the movement of a stationary object involves approaching the camera from a distant position (appearance point) in the image, and subsequently moving away to a disappearance point on the side opposite to the direction of movement. At this time, if the divided position for panoramic expansion is an inappropriate position, the movement of the object in the image appears to be unnatural, giving a feeling of strangeness to a viewer of the panoramically expanded moving image.

SUMMARY OF THE INVENTION

The present invention has been made in consideration of the aforementioned problems, and realizes a technique for making it possible to obtain a natural image that does not give a feeling of strangeness when panoramically expanding an omnidirectional image shot while moving a camera.

In order to solve the aforementioned problems, the present invention provides an image processing apparatus comprising: an image obtaining unit configured to obtain an omnidirectional image; a traveling direction obtaining unit configured to obtain information on a traveling direction of an image capturing apparatus when the omnidirectional image was shot; and a processing unit configured to perform processing of panoramic expansion on the omnidirectional image obtained by the image obtaining unit, based on the information on the traveling direction obtained with the traveling direction obtaining unit, such that an image portion corresponding to the traveling direction is positioned at a horizontal center in a panoramically expanded image, wherein the processing unit performs processing of panoramic expansion in accordance with change in the traveling direction in a case where the traveling direction changes while shooting the omnidirectional image that is a moving image.

In order to solve the aforementioned problems, the present invention provides a control method of an image processing apparatus comprising: obtaining an omnidirectional image; obtaining information on a traveling direction of an image capturing apparatus when the omnidirectional image was shot; and performing processing of panoramic expansion on the obtained omnidirectional image, based on the obtained information on the traveling direction, such that an image portion corresponding to the traveling direction is positioned at a horizontal center in a panoramically expanded image, wherein processing of panoramic expansion is executed in accordance with change in the traveling direction in a case where the traveling direction changes while shooting the omnidirectional image that is a moving image.

In order to solve the aforementioned problems, the present invention provides a non-transitory computer-readable storage medium storing a program for causing a computer to function as an image obtaining unit, a traveling direction obtaining unit and a processing unit of an image processing apparatus, wherein the image obtaining unit obtains an omnidirectional image, the traveling direction obtaining unit obtains information on a traveling direction of an image capturing apparatus when the omnidirectional image was shot, and the processing unit performs processing of panoramic expansion on the omnidirectional image obtained by the image obtaining unit, based on the information on the traveling direction obtained with the traveling direction obtaining unit, such that an image portion corresponding to the traveling direction is positioned at a horizontal center in a panoramically expanded image, and wherein the processing unit performs processing of panoramic expansion in accordance with change in the traveling direction in a case where the traveling direction changes while shooting the omnidirectional image that is a moving image.

According to the present invention, an image that does not give a feeling of strangeness can be obtained when panoramically expanding an omnidirectional image shot while moving a camera.

Further features of the present invention will become apparent from the following description of exemplary embodiments (with reference to the attached drawings).

BRIEF DESCRIPTION OF THE DRAWINGS

FIG. 5 is a flowchart showing omnidirectional image display processing.

DESCRIPTION OF THE EMBODIMENTS

Embodiments in which an image processing apparatus according to the present invention is applied to an omnidirectional camera capable of shooting an omnidirectional image (moving image) and panoramically expanding the image will be described below in detail with reference to the accompanying drawings.

The omnidirectional camera in this embodiment performs control such that panoramic expansion is performed on an omnidirectional moving image having a donut shape before panoramic expansion using a divided position set rearward in the traveling direction and the movement track of an object is not cutoff at a position other than a position at the front in the traveling direction in the moving image after the panoramic expansion.

First, as an example in which the control according to the present invention is not applied, processing in the case where an omnidirectional moving image shot while moving a camera is divided at a fixed position different from the front or rear in the traveling direction of the camera and is panoramically expanded will be described with reference to FIGS. 2A to 2C.

Figure 1A:
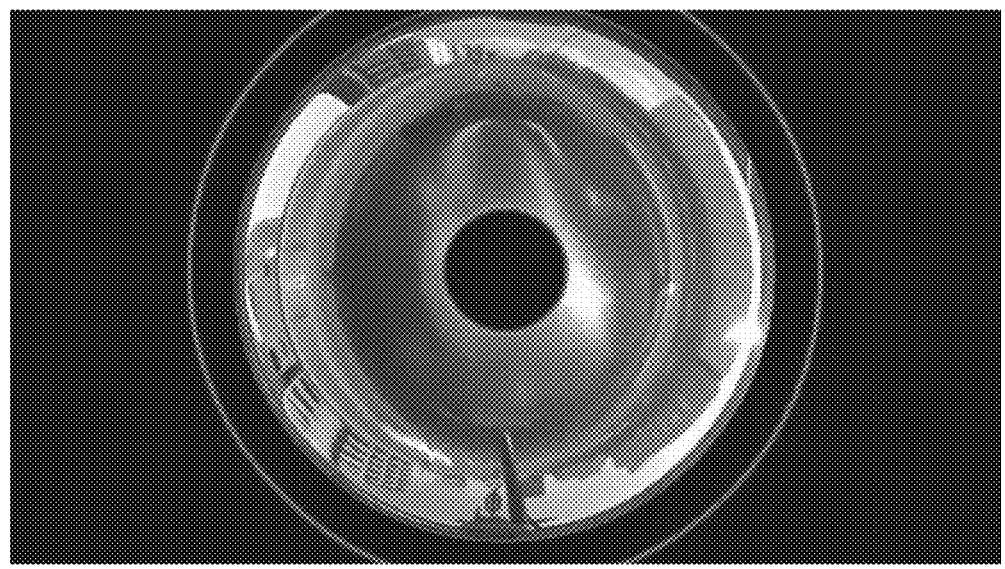
FIGS. 1A and 1B are diagrams illustrating an omnidirectional image before and after panoramic expansion.
Figure 1B:
Figure 2A:
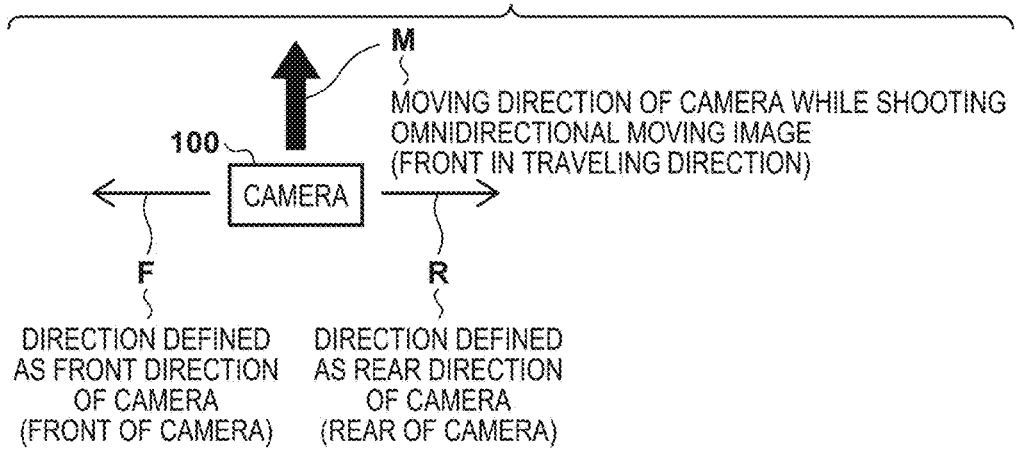
FIGS. 2A to 2C are explanatory diagrams regarding a positional relation between an omnidirectional image and a panoramically expanded image.

FIG. 2A schematically shows a state of the omnidirectional moving image while being shot.

As shown in the figure, a camera 100 that shot the omnidirectional moving image is assumed to have shot the omnidirectional moving image while being moved in the direction 90 degrees to the right of a direction F defined as the front direction of the camera 100 (hereinafter referred to as the front of the camera). The front in the direction of movement of the camera 100 while shooting the moving image in this case is referred to as front in the traveling direction (or traveling direction) M. Moreover, the front of the camera F is in a fixed direction with respect to the camera 100, and thus will always be at the same fixed position in a captured omnidirectional image having a donut shape. The rear of the camera R is in a direction opposite to the front of the camera F, and is at a fixed position similarly to the front of the camera F.

On the other hand, the traveling direction M is not a fixed direction with respect to the camera 100, but is a direction that changes depending on the direction of the movement of the camera when the omnidirectional moving image is being shot. Therefore, even with a single omnidirectional moving image, the traveling direction shifts if the direction of the movement of the camera changes during the shooting, and the traveling direction M changes depending on a reproduction position. That is, the front in the traveling direction M is not necessarily always at the same position in the captured omnidirectional image having a donut shape.

Figure 2B:
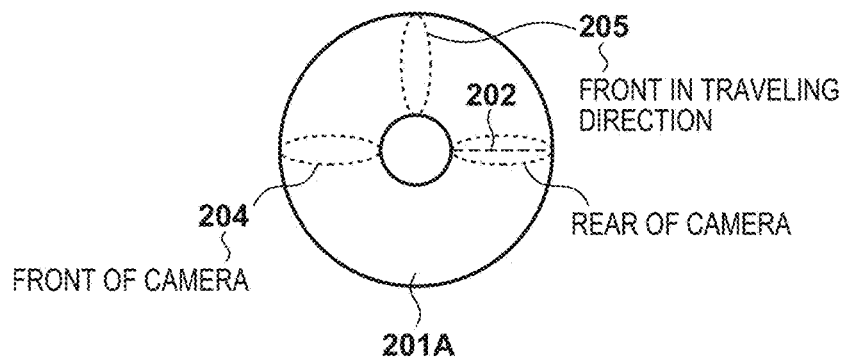

FIG. 2B schematically shows an omnidirectional image having a donut shape that was captured in the positional relation shown in FIG. 2A. As shown in the figure, an image 201A is an omnidirectional moving image having a donut shape (omnidirectional image before panoramic expansion) that was shot in the positional relation shown in FIG. 2A, and the images in the front in the traveling direction M, in the front of the camera F, and in the rear of the camera R are respectively shown at positions 205, 204, and 202 shown in the figure. The position 202 indicates a divided position when the image 201A is panoramically expanded and the image in the front of the camera F is to be arranged at a horizontally central position. As shown in the figure, in the case where the image in the front of the camera F is arranged at the horizontally central position 204 and a panoramic image is generated by panoramically expanding the entire range (360 degrees) of the image 201A, the rear of the camera R will be at the divided position 202.

Figure 2C:
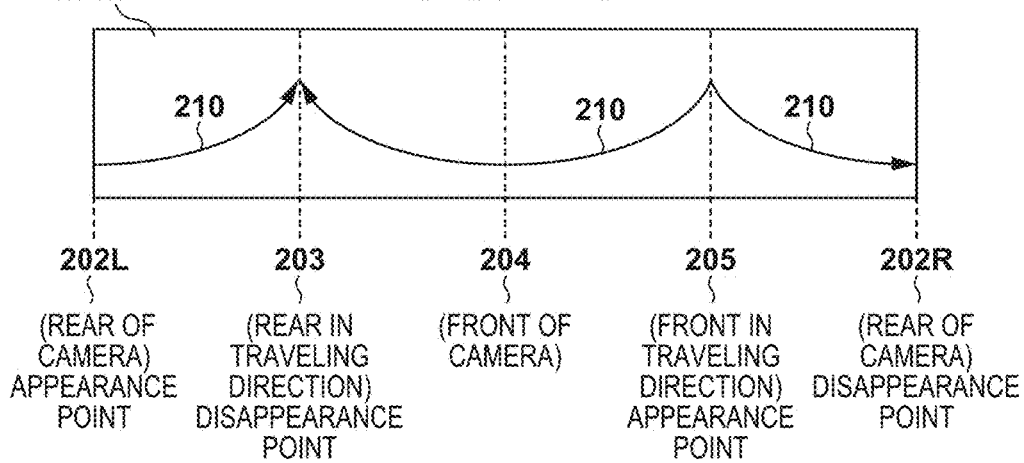

FIG. 2C shows a panoramic image 201B generated by dividing, at the divided position 202 shown in FIG. 2B, the omnidirectional image 201A having a donut shape shot in the positional relation shown in FIG. 2A and panoramically expanding the image. As shown in the figure, positions 202L and 202R at the two ends of the image 201B indicate two right and left positions corresponding to the divided position 202 in the image 201A. A position 203 indicates a position corresponding to the rear in the traveling direction (a position at which an image in the rear in the traveling direction is shown) on the side opposite to the front in the traveling direction M in the omnidirectional image 201A. The position 204 indicates a position corresponding to the front of the camera F in the omnidirectional image 201A (a position at which an image in the front of the camera F is shown). The position 205 indicates a position corresponding to the front in the traveling direction M in the omnidirectional image 201A (a position at which an image in the front in the traveling direction M is shown). An arrow 210 indicates the direction in which a stationary object moves, with the elapse of time, in the panoramic image 201B that is a moving image (that is, a direction in which the position of the stationary object in the image moves relatively due to the camera 100 moving). A stationary image such as that of a landscape appears, in a moving image, as if the image is flowing in the direction of the arrow 210. The stationary object is shown, as indicated by the arrow 210, in such a manner as to appear from an infinite distance in the front in the traveling direction M in the image, create an arcuate track in the image, and disappear into an infinite distance in the rear in the traveling direction. Hereinafter, an appearance position of an object in an image is referred to as appearance point, and a disappearance position of an object in an image is referred to as disappearance point. Note that, at the divided position 202R, the object seems to disappear on the right side, and at the divided position 202L, the object that disappeared at the divided position 202R seems to appear from the left side. In this manner, at the divided positions 202R and 202L, the movement of the object in the image will be cut off. Therefore, for example, in the case where a viewer is focusing on a specific object which appears from the position 205 and moves to the position 202R, the focus has to be immediately shifted from the position 202R to the position 202L on the side opposite to the direction of the movement of the object, making the image hard to view. In this manner, if the divided position 202 is set at a position where the object in the image is moving and the omnidirectional image is expanded, it becomes difficult for a viewer to follow the object moving in the panoramic image with their eyes, making the image have a poor viewability for the viewer.

Next, as an example of the case where the control according to the present invention is applied, the processing in the case where an omnidirectional moving image shot while moving a camera is divided in the rear in the traveling direction of the camera 100 and is panoramically expanded will be described.

Figure 3A:
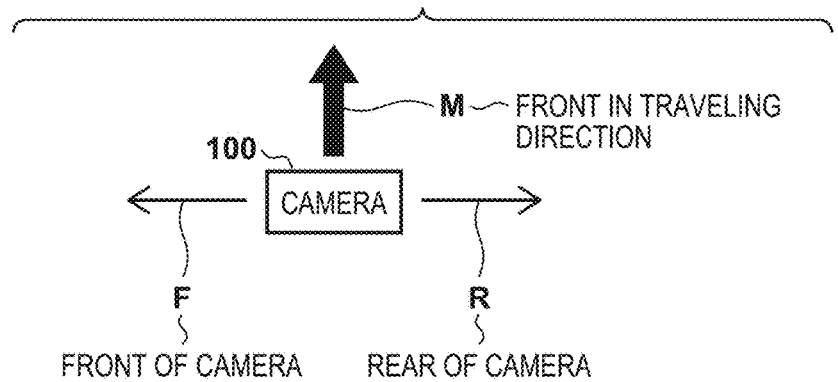
FIGS. 3A to 3C are explanatory diagrams regarding a positional relation between an omnidirectional image and a panoramically expanded image.

FIG. 3A schematically shows a state of the omnidirectional moving image while being shot, and it is assumed that the omnidirectional moving image was shot while moving the camera in the direction 90 degrees to the right of the front of the camera F, similarly to FIG. 2A.

Figure 3B:
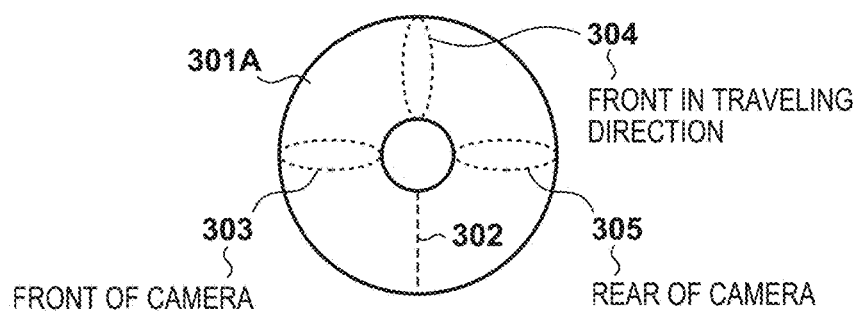

FIG. 3B shows the relation between an omnidirectional image 301A before panoramic expansion captured in the positional relation shown in FIG. 3A and a divided position 302 of a panoramically expanded omnidirectional image 301B. As shown in the figure, in this embodiment, the divided position 302 is set on a side opposite to the front in the traveling direction M in the omnidirectional image 301A before panoramic expansion, that is, the rear in the traveling direction.

Figure 3C:
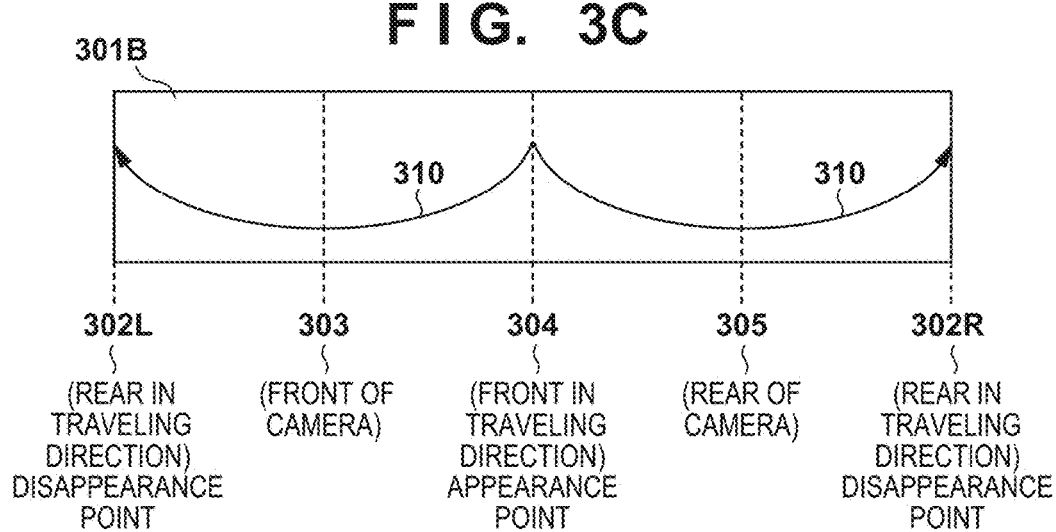

FIG. 3C shows the panoramic image 301B generated by panoramically expanding the image 301A using the divided position 302 set in the rear in the traveling direction as shown in FIG. 3B. Positions 302L and 302R at the two ends of the image 301B indicate two right and left positions corresponding to the divided position 302 in the image 301A. A position 303 indicates a position corresponding to the front of the camera F in the omnidirectional image 301A, a position 304 indicates a position corresponding to the front in the traveling direction M in the image 301A, and a position 305 indicates a position corresponding to the rear of the camera R in the image 301A. An arrow 310 indicates a direction in which a stationary object moves, with the elapse of time, in the panoramic image 301B that is a moving image (moving track created by the position of the stationary object in the image moving relatively due to the camera 100 moving). Due to the omnidirectional image 301A being panoramically expanded in this manner, in the panoramic image 301B, the appearance point is the position 304 at the center of the image 301B, and the disappearance point is the positions 302L and 302R that are equal in horizontal distance from the position 304 at the center of the image 301B. That is, the object appears from an infinite distance at the center of the image 301B, creates arcuate tracks toward the right and the left, and disappears from the two places at the two ends. By setting the divided position 302 used for panoramically expanding the omnidirectional image at an image portion in the rear in the traveling direction in this manner, the moving track of the object in the panoramic image 301B is not cut off at the position 203 where the object is moving as the image 201B shown in FIG. 2C. Therefore, in the case of visually following the movement of the object moving with the elapse of time in the panoramic image 301B, it is not necessary to greatly move the line of sight from the appearance to the disappearance, thereby improving viewability.

The configuration and the control for realizing the processing of panoramic expansion of an omnidirectional moving image of this embodiment described with reference to FIG. 3 will be described below.

Apparatus Configuration

First, the configuration of an image processing apparatus 400 of this embodiment will be described with reference to FIG. 4.

The image processing apparatus 400 can be constituted using a personal computer (hereinafter, referred to as PC) or the like.

A CPU 401, a memory 402, a nonvolatile memory 403, an image processing unit 404, a display unit 405, an operation unit 406, a recording medium I/F 407, an external I/F 409, a communication I/F 410, a sound processing unit 412, and a sound output unit 413 are connected to an internal bus 450. The units connected to the internal bus 450 are configured to be able to exchange data with one another via the internal bus 450.

The memory 402 comprises a RAM (such as a volatile memory using a semiconductor element), for example. The CPU 401 uses the memory 402 as a work memory and controls units of the image processing apparatus 400 in accordance with programs stored in the nonvolatile memory 403, for example. The nonvolatile memory 403 stores image data, sound data, other data, various programs for operating the CPU 401, and the like. The nonvolatile memory 403 is constituted by a hard disk (HDD), a ROM, a flash memory or the like, for example.

The image processing unit 404 performs various types of image processing on image data stored in the nonvolatile memory 403 or a recording medium 408, an image signal obtained via the external I/F 409, image data obtained via the communication I/F 410 and the like based on the control by the CPU 401. The image processing performed by the image processing unit 404 includes A/D conversion processing, D/A conversion processing, image data encoding processing, compression processing, decoding processing, enlargement/reduction processing (resizing), noise reduction processing, color conversion processing and the like. The image processing unit 404 also performs processing of expanding the above-described omnidirectional image having a donut shape (including a still image and a moving image) into a panoramic image. The image processing unit 404 may be constituted by a circuit block dedicated to performing specific image processing. Moreover, depending on the type of image processing, it is possible for the CPU 401 to perform image processing in accordance with a program without using the image processing unit 404.

The display unit 405 displays an image or a GUI screen that constitutes a GUI (Graphical User Interface) and the like, based on the control by the CPU 401. The CPU 401 controls units of the image processing apparatus 400 so as to generate a display control signal in accordance with a program, generate an image signal used for display on the display unit 405 and output the image signal to the display unit 405. The display unit 405 displays an image based on the output image signal. Note that the configuration that the image processing apparatus 400 itself is provided with is limited to an interface for outputting an image signal used for the display on the display unit 405, and the display unit 405 may be constituted by an external monitor (such as a television).

The operation unit 406 is an input device for accepting a user operation, including a character information input device such as a keyboard, a pointing device such as a mouse or a touch panel, a button, a dial, a joystick, a touch sensor, a touch pad and the like. Note that the touch panel is an input device that is laid upon the display unit 405 and configured in a plane, and in which coordinate information in accordance with a touched position is output.

The recording medium I/F 407, to which the recording medium 408 such as a memory card, a CD, or a DVD can be mounted, performs reading out of data from the mounted recording medium 408 and writing of data to the recording medium 408 based on the control by the CPU 401. The external I/F 409 is an interface that connects to an external device using a wired cable or wirelessly and is used for input/output of an image signal or a sound signal. The communication I/F 410 is an interface for performing transmission/reception of various types of data such as a file or a command by performing communication wirelessly or by a wireline via an external device or a network 411 such as the Internet.

The sound processing unit 412 performs sound processing using the sound of a moving image with one or more channels so as to reproduce sound image localization, and outputs the processed sound with two or more channels (e.g., stereo) to the sound output unit 412.

The sound output unit 413 is an output unit that outputs a sound of two or more channels to a speaker or the like. The sound output from the sound output unit 413 can be listened to using a stereo, a speaker or a headphone with two or more channels (e.g., 5.1 channels) or the like.

Figure 4:
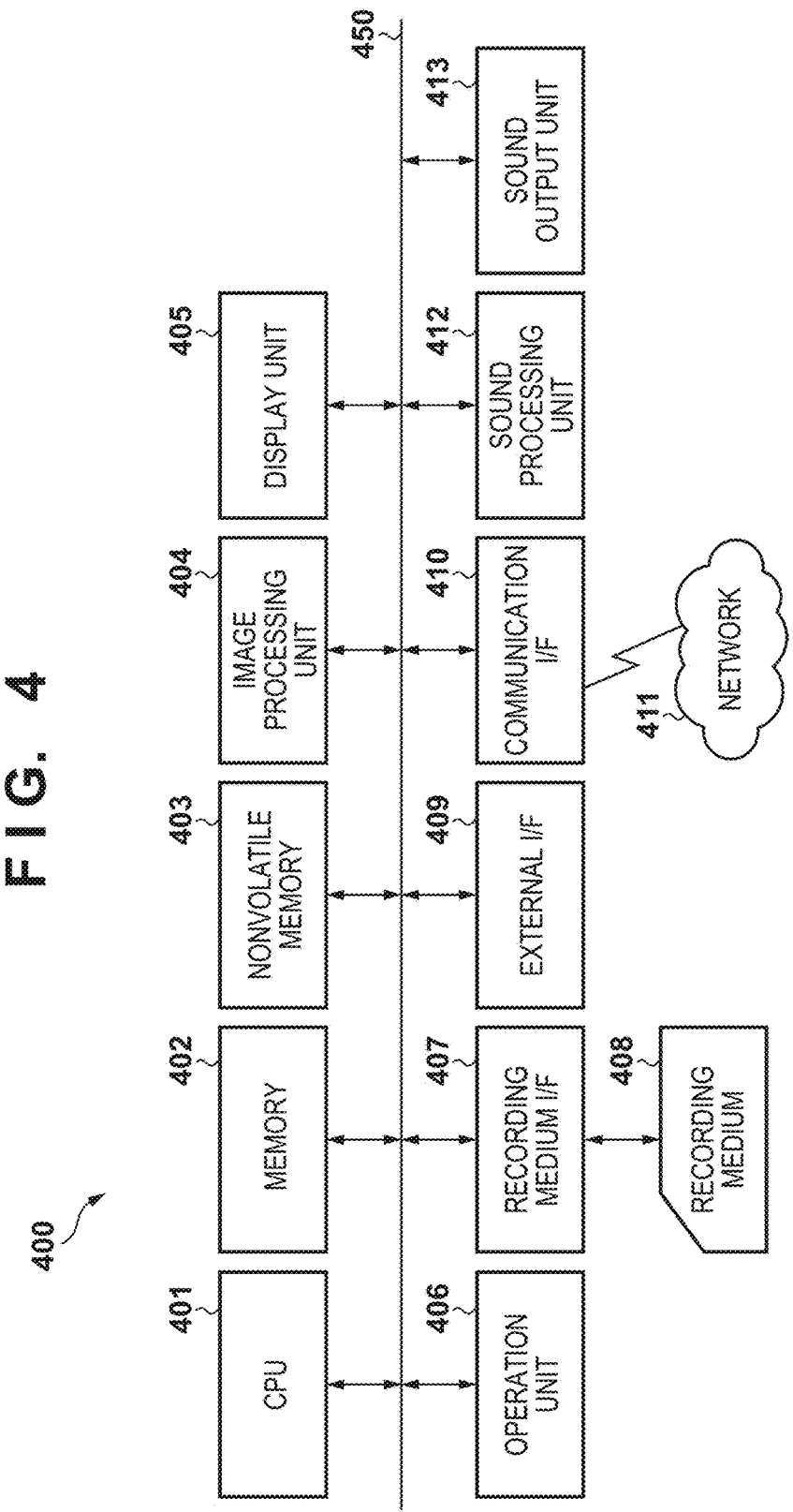
FIG. 4 is a block diagram showing an apparatus configuration of an embodiment.

Note that the image processing apparatus 400 may further have an image capturing unit comprising an optical system such as a lens and a diaphragm and an image sensor (e.g., CMOS image sensor) and capable of shooting an omnidirectional moving image, and a sound input unit (e.g., microphone) for inputting the sound of a moving image, which are not illustrated in FIG. 4. In the case where the image processing apparatus 400 has the image capturing unit that can shoot an omnidirectional moving image, the image processing unit 404 can panoramically expand the omnidirectional moving image captured with the image capturing unit as described later. Moreover, in the case where the apparatus has the image capturing unit, there may be a traveling direction detection sensor (e.g., acceleration sensor) for detecting the direction of the movement of a camera when shooting an omnidirectional moving image. In this case, the CPU 401 stores, in the recording medium 408 through the image processing unit 404 or the recording medium I/F 407, additional information indicating the traveling direction in the omnidirectional moving image (traveling direction information) based on the output of the traveling direction detection sensor, along with the omnidirectional moving image captured with the image capturing unit.

The image processing unit 404 panoramically expands a donut-shaped omnidirectional moving image obtained from the image capturing unit based on the traveling direction information, such that a divided position is set in the rear in the traveling direction. Note that this processing may be performed substantially in real time with the shooting of the moving image. Moreover, the image processing unit 404 records the panoramically expanded omnidirectional moving image to the recording medium 408, or outputs the panoramically expanded omnidirectional moving image to an external device (e.g., recording apparatus) via the external I/F 409 or the communication I/F 410. The image processing unit 404 also panoramically expands a donut-shaped omnidirectional moving image read out from the recording medium 408 based on the traveling direction information stored in association with the omnidirectional moving image, such that a divided position is set in the rear in the traveling direction. This processing may be performed substantially in real time with the reproduction of the moving image. Furthermore, the image processing unit 404 records the panoramically expanded omnidirectional moving image to the recording medium 408, outputs the panoramically expanded omnidirectional moving image to an external device (e.g., reproduction apparatus) via the external I/F 409 or the communication I/F 410, or displays the panoramically expanded omnidirectional moving image on the display unit 405. Furthermore, the sound processing unit 412 performs sound image localization on the sound of an omnidirectional moving image input from a sound input unit based on the traveling direction information (sound image localization processing). This processing may be performed substantially in real time with the shooting of the moving image. The sound subjected to the sound image localization processing is recorded to the recording medium 408, as the sound of the panoramically expanded omnidirectional moving image, or is output to an external device (e.g., recording apparatus or reproduction apparatus) via the external I/F 409 or the communication I/F 410, along with the panoramically expanded omnidirectional moving image. The sound processing unit 412 also performs the sound image localization processing on the sound of an omnidirectional moving image read out from the recording medium 408 based on the traveling direction information stored in association with the omnidirectional moving image. Note that this processing may be performed substantially in real time with the reproduction of the moving image. The sound subjected to the sound image localization processing is recorded to the recording medium 408, as the sound of the panoramically expanded omnidirectional moving image, is output to an external device (e.g., recording apparatus or reproduction apparatus) via the external I/F 409 or the communication I/F 410, or is output from the sound output unit 413.

Processing of Displaying Omnidirectional Moving Image

Next, the processing of panoramic expansion and the processing of display of an omnidirectional moving image in this embodiment will be described with reference to FIG. 5.

Note that the processing in FIG. 5 is realized by the CPU 401 reading out, to the memory 402, a control program stored in the nonvolatile memory 403 and executing the control program. This processing is also executed while panoramically expanding an omnidirectional moving image having a donut shape and then displaying or recording the panoramically expanded moving image when shooting or reproducing the omnidirectional moving image (i.e., format conversion). That is, the processing is started when an instruction of shooting, reproduction, or panoramic expansion of an omnidirectional moving image is accepted.

In step S501, the CPU 401 obtains a donut-shaped omnidirectional moving image (image obtaining processing). The donut-shaped omnidirectional moving image can be obtained from the recording medium 408, from an external device via the external I/F 409 or the communication I/F 410, or from an image capturing unit (not illustrated) as described above. In step S501, the CPU 401 also obtains the sound of the omnidirectional moving image from the sound input unit (sound obtaining processing).

In step S502, the CPU 401 detects the traveling direction of the omnidirectional moving image (traveling direction obtaining processing). This is detected from the traveling direction information added as additional information (attribute information) of the omnidirectional moving image obtained in step S501. However, this may be detected by performing image analysis on the omnidirectional moving image without using the additional information on the omnidirectional moving image. In this case, for example, by detecting the movement direction of the object in the donut-shaped omnidirectional moving image, it can be determined that an appearance point of the object is in the front in the traveling direction and a disappearance point is in the rear in the traveling direction. The movement direction of the object can be obtained by calculating a movement vector from the difference from a previous frame. More specifically, first, the entire donut-shaped image of 360 degrees is expanded into a panoramic image shaped as a laterally long rectangle, centered on an arbitrary appropriate position such as the front of the camera in order to detect a movement vector. Next, in accordance with the control by the CPU 401, the panoramic image is divided into a plurality of blocks, and the movement vector is detected from the difference from a previous frame for each block. A position at which many blocks with a movement vector oriented opposite to a long axis direction of the panoramically expanded panoramic image are successively detected in a short axis direction of the panoramically expanded panoramic image is detected as a traveling direction. Moreover, the detected traveling direction may be stored in the memory 402 so that the latest traveling direction stored in the memory 402 serves as a current traveling direction, in the case where the traveling direction in the panoramic image cannot be detected with any method. Moreover, in the case where a traveling direction cannot be detected before storing the traveling direction in the memory 402 with the above-described method, a predetermined direction such as the front of the camera may be used as a current traveling direction.

In step S503, the CPU 401 controls the image processing unit 404 so as to perform panoramic expansion on the omnidirectional moving image such that the traveling direction detected in step S502 comes to the center of the image after the panoramic expansion. At this time, there is no need to necessarily panoramically expand the entire image of 360 degrees, and only a specific range centered on the traveling direction may be panoramically expanded. In the panoramic expansion, in the case of panoramically expanding the entire range (360 degrees) of the omnidirectional image having a donut shape, the CPU 401 sets a divided position in the rear in the traveling direction detected in step S502. Moreover, in the case of panoramically expanding a specific range only, the CPU 401 determines the range of the image to be panoramically expanded such that the traveling direction detected in step S502 comes to the center of the specific range, and sets positions at the two ends of the determined range of the image as the divided position of the omnidirectional image having a donut shape. The CPU 401 also stores, in the memory 402, panoramic expansion information indicating a direction in which a center position for the panoramic expansion was set in step S503 (traveling direction) and a panoramic expansion range.

In step S504, the CPU 401 controls the sound processing unit 412, and performs localization control (sound image localization processing) on a sound image using the panoramic expansion information (a direction in which a center position for panoramic expansion is set, and a panoramic expansion range) stored in the memory 402 in step S503. The sound processing unit 412 localizes the sound image such that a sound image position corresponding to the panoramic expansion center direction obtained from the panoramic expansion information is positioned directly in front of a viewer. The sound processing unit 412 also localizes the sound image position such that the position of the panoramic image from the panoramic expansion range obtained from the panoramic expansion information matches the position of the corresponding sound image. Thereby, for example, even in the case where an image that is supposed to be positioned at the back of a photographer is positioned at the two ends of the display unit, such as the case of panoramically expanding the entire range (360 degrees) of the omnidirectional image, a sound image positioned at the back of the photographer can be similarly arranged at the two ends of the display unit, making it possible to prevent a deviation between the image and the sound image. Specifically, in the localization processing of a sound image, adjustment of a sound volume mix ratio of sounds output with two or more channels, adjustment of a time difference, adjustment of a frequency property, adjustment of a phase, adjustment of reverberation, and the like are performed.

In step S505, the CPU 401 performs control so as to display, on the display unit 405, the omnidirectional moving image panoramically expanded in step S503, and outputs, from the sound output unit 413, the sound subjected to the sound image localization processing in step S504. At the same time, or alternatively, the omnidirectional moving image panoramically expanded in step S503 and the sound subjected to the sound image localization processing in step S504 may be recorded in the recording medium 408, or may be output via the external I/F 409 or the communication I/F 410 to an external device.

In step S506, the CPU 401 determines whether or not a stop of shooting or reproduction of the omnidirectional moving image or a stop of panoramic expansion processing has been instructed. In the case where it is determined as the result of the determination that the stop has not been instructed, the CPU 401 returns the procedure to step S501 and repeats the processing in order to execute the processing on a subsequent frame of the omnidirectional moving image, and in the case where it is determined that the stop has been instructed, ends the procedure.

In the above-described embodiment, an example in which the present invention is applied to an omnidirectional image that is a moving image was described, but the present invention is applicable not only to a moving image, but also to a still image in the case where difference in time or position between images is small such as consecutively photographed images and thus the movement vector of the object in an omnidirectional image can be detected and in the case where a traveling direction can be detected from additional information.

According to this embodiment, even in the case where the front of the camera (center position in the image in the case where panoramic expansion was performed at a default divided position) which shot the omnidirectional moving image and the traveling direction of the camera do not match, a suitable image as in FIG. 3C can be obtained, instead of the image as in FIG. 2C. By panoramically expanding an omnidirectional image such that the traveling direction is at the center in this manner, an image having one disappearance point at the center of the image as in FIG. 3C can be obtained in either case of a moving image or a still image, enabling an image that is easy for a viewer to view. Especially, in the case of a moving image, the effect is greater because the image flows. Moreover, a sound image position is adjusted by sound image localization processing based on the center direction for panoramic expansion (i.e., traveling direction), and thus sound image localization is also adjusted in accordance with change in the traveling direction. Therefore, it is possible to appreciate a realistic image in accordance with the change in traveling direction.

Note that in the above-described example, a donut-shaped image was used as an example of an omnidirectional image (omnidirectional moving image) before panoramic expansion, but a circular image in which a center portion is not removed like a donut can also be used (this depends on the capability or the method of the omnidirectional camera). The present invention is also applicable when panoramically expanding such a circular omnidirectional image (omnidirectional moving image). In this case, one divided position is set as a line segment connecting the center point of the circular omnidirectional image and one point on a circumference. According to the present invention, this divided position is determined such that the horizontal center of the image after panoramic expansion is a traveling direction.

Moreover, in the above-described example, the case of panoramically expanding an omnidirectional image composed of one image was described, but the present invention is also applicable to an omnidirectional image composed of a plurality of separated images that are joined by performing image processing. For example, one image (still image or moving image) covering all directions can be generated by joining images (a plurality of separated images) shot in different directions with a plurality of camera units. Such plurality of separated images used for generating an image covering all directions are also one type of omnidirectional image. In this case, it is needless to say that the present invention is applicable in the case of panoramically expanding a donut-shaped or circular omnidirectional image resulting from joining a plurality of separated images. The present invention is also applicable in the case of calculating an image portion necessary for panoramic expansion before joining a plurality of separated images, and generating an image resulting from directly panoramically expanding the plurality of separated images. In this case, the image portion necessary for the panoramic expansion in the plurality of separated images is calculated, such that the image portion present in the traveling direction is positioned at the horizontal center of the image resulting from the panoramic expansion.

Note that a single item of hardware may control the CPU 401, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiment has described an example in which the present invention is applied to a camera capable of shooting an omnidirectional image, the present invention is not limited to this example. The present invention is applicable to, for example, an image capturing apparatus, an electronic apparatus and an information processing apparatus which are capable of spreading out the omnidirectional image. More specifically, the present invention is applicable to a personal computer, a PDA (Personal Digital Assistant), a mobile telephone, a smart phone which is a kind of the mobile telephone terminal, a tablet, a music player, a game console, an electronic book reader and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-227486, filed on Nov. 7, 2014, which is hereby incorporated by reference herein in its entirety.

What is claimed is:

1. An image processing apparatus comprising:
an image capturing unit configured to obtain an omnidirectional image;
at least one processor; and
a memory storing instructions therein which cause the at least one processor to perform operations of:
a traveling direction obtaining unit configured to obtain information on a traveling direction of an image capturing apparatus when the omnidirectional image was shot; and
a processing unit configured to perform processing of panoramic expansion on the omnidirectional image obtained by the image capturing unit to generate a panoramically expanded image, based on the information on the traveling direction obtained with the traveling direction obtaining unit, such that an image portion of the omnidirectional image corresponding to the traveling direction is positioned at a horizontal center in the panoramically expanded image,
wherein the processing unit performs processing of panoramic expansion in accordance with change in the traveling direction in a case where the traveling direction changes while shooting the omnidirectional image that is a moving image.

2. The apparatus according to claim 1, wherein the processing unit performs processing of panoramic expansion in accordance with the traveling direction of the image capturing apparatus, also in a case where a front of the image capturing apparatus that shot the omnidirectional image and the traveling direction do not match.

3. The apparatus according to claim 1, wherein the processing unit sets a divided position in the omnidirectional image such that the traveling direction of the image capturing apparatus is at a center of the panoramically expanded image.

4. The apparatus according to claim 3, wherein the divided position is in the rear in the traveling direction of the image capturing apparatus.

5. The apparatus according to claim 3, wherein the divided position is at two places that are equal in horizontal distance from the traveling direction of the image capturing apparatus in the panoramically expanded image.

6. The apparatus according to claim 1, wherein the traveling direction obtaining unit obtains information on a traveling direction of the image capturing apparatus from attribute information stored in association with the omnidirectional image.

7. The apparatus according to claim 1,
wherein the traveling direction obtaining unit analyzes the omnidirectional image, and obtains information on a traveling direction of the image capturing apparatus based on a movement of an object in the omnidirectional image.

8. The apparatus according to claim 1,
wherein the traveling direction obtaining unit obtains information on a traveling direction of the image capturing apparatus using a detection sensor provided in the image capturing apparatus and configured to detect a traveling direction.

9. The apparatus according to claim 1, further comprising:
a sound input device configured to obtain a sound associated with the omnidirectional image,
wherein the memory further stores instructions which cause the at least one processor to perform operations of a sound processing unit configured to perform processing of sound image localization on the sound obtained by the sound processing unit in conformity with a panoramic expansion range of the omnidirectional image.

10. The apparatus according to claim 9,
wherein the sound processing unit performs processing of sound image localization such that a sound image in the traveling direction of the image capturing apparatus is positioned at a center of a display unit configured to display the panoramically expanded image.

11. The apparatus according to claim 1, wherein the memory further stores instructions which cause the at least one processor to perform operations of a display control unit configured to perform control such that the image panoramically expanded by the processing unit is displayed on a display unit.

12. A control method of an image processing apparatus comprising:
obtaining an omnidirectional image;
obtaining information on a traveling direction of an image capturing apparatus when the omnidirectional image was shot; and
performing processing of panoramic expansion on the obtained omnidirectional image to generate a panoramically expanded image, based on the obtained information on the traveling direction, such that an image portion of the omnidirectional image corresponding to the traveling direction is positioned at a horizontal center in the panoramically expanded image,
wherein processing of panoramic expansion is executed in accordance with change in the traveling direction in a case where the traveling direction changes while shooting the omnidirectional image that is a moving image.

13. A non-transitory computer-readable storage medium storing a program for causing a computer to perform a control method comprising:
obtaining an omnidirectional image,
obtaining, information on a traveling direction of an image capturing apparatus when the omnidirectional image was shot, and
performing processing of panoramic expansion on the obtained omnidirectional image to generate a panoramically expanded image, based on the obtained information on the traveling direction, such that an image portion of the omnidirectional image corresponding to the traveling direction is positioned at a horizontal center in the panoramically expanded image,
wherein the processing of panoramic expansion is executed in accordance with change in the traveling direction in a case where the traveling direction changes while shooting the omnidirectional image that is a moving image.

14. An image processing apparatus comprising:
an image capturing unit configured to obtain an omnidirectional image;
at least one processor; and
a memory storing instructions therein which cause the at least one processor to perform operations of:
a traveling direction obtaining unit configured to obtain information on a traveling direction of an image capturing apparatus when the omnidirectional image was shot; and
a processing unit configured to perform processing of deforming and cutting out a partial range which is not an entire image on the omnidirectional image obtained by the image capturing unit to generate a deformed partial image, based on the information on the traveling direction obtained with the traveling direction obtaining unit, such that an image portion of the omnidirectional image corresponding to the traveling direction is positioned at a horizontal center in the deformed partial image,
wherein the processing unit performs processing of deforming and cutting out a partial range which is not an entire image in accordance with change in the traveling direction in a case where the traveling direction changes while shooting the omnidirectional image that is a moving image.

15. The apparatus according to claim 14,
wherein the traveling direction obtaining unit obtains information on a traveling direction of the image capturing apparatus from attribute information stored in association with the omnidirectional image.

16. The apparatus according to claim 14,
wherein the traveling direction obtaining unit analyzes the omnidirectional image, and obtains information on a traveling direction of the image capturing apparatus based on a movement of an object in the omnidirectional image.

17. The apparatus according to claim 14,
wherein the traveling direction obtaining unit obtains information on a traveling direction of the image capturing apparatus using a detection sensor provided in the image capturing apparatus and configured to detect a traveling direction.

18. The apparatus according to claim 14, further comprising:
a sound input device configured to obtain a sound associated with the omnidirectional image: and
the memory further stores instructions which cause the at least one processor to perform operations of a sound processing unit configured to perform processing of sound image localization on the sound obtained by the sound processing unit in conformity with the deformed partial image of the omnidirectional image.

19. The apparatus according to claim 18
wherein the sound processing unit performs processing of sound image localization such that a sound image in the traveling direction of the image capturing apparatus is positioned at a center of a display unit configured to display the deformed partial image.

20. The apparatus according to claim 14, wherein the memory further stores instructions which cause the at least one processor to perform operations of a display control unit configured to perform control such that the deformed partial image generated by the processing unit is displayed on a display unit.

21. A control method of an image processing apparatus comprising:

obtaining an omnidirectional image;

obtaining information on a traveling direction of an image capturing apparatus when the omnidirectional image was shot; and performing processing of deforming and cutting out a partial range which is not an entire image on the obtained omnidirectional image to generate a deformed partial image, based on the obtained information on the traveling direction, such that an image portion of the omnidirectional image corresponding to the traveling direction is positioned at a horizontal center in the deformed partial image, wherein processing of deforming and cutting out a partial range which is not an entire image is executed in accordance with change in the traveling direction in a case where the traveling direction changes while shooting the omnidirectional image that is moving image.

22. A non-transitory computer-readable storage medium storing a program for causing a computer to perform a control method comprising:

obtaining an omnidirectional image, obtaining information on a traveling direction of an image capturing apparatus where the omnidirectional image was shot, and performing processing of deforming and cutting out a partial range which is not an entire image on the obtained omnidirectional image to generate a deformed partial image, based on the obtained information on the traveling direction, such that an image portion of the omnidirectional image corresponding to the traveling direction is positioned at a horizontal center in the deformed partial image, wherein the processing of deforming and cutting out a partial range which is not an entire image is executed in accordance with change in the traveling direction in a case where the traveling direction changes shooting the omnidirectional image that is a moving image.

* * * * *